(12) United States Patent
Wilson

(10) Patent No.: US 6,451,115 B1
(45) Date of Patent: Sep. 17, 2002

(54) WOOD PARTICLE/RESIN ETC. TUMBLER-BLENDER

(75) Inventor: Elwin R. Wilson, Portland, OR (US)

(73) Assignee: Louisiana-Pacific Corp., Portland, OR (US)

( * ) Notice: Subject to any disclaimer, the term of this patent is extended or adjusted under 35 U.S.C. 154(b) by 0 days.

(21) Appl. No.: 09/574,722

(22) Filed: May 18, 2000

Related U.S. Application Data

(60) Provisional application No. 60/135,296, filed on May 21, 1999.

(51) Int. Cl.$^7$ ............................. B05B 17/00; B05D 7/02
(52) U.S. Cl. ........................................ 118/303; 118/19
(58) Field of Search ................... 118/303, 19, 20, 118/50, 64, 417, 418; 366/220, 231

(56) References Cited

U.S. PATENT DOCUMENTS 3,013,525 A * 12/1961 Fuller et al. ............... 118/303
3,974,307 A    8/1976 Bowen
3,991,225 A   11/1976 Blouin
4,272,234 A    6/1981 Tse
4,430,003 A    2/1984 Beattie et al.
4,507,335 A *  3/1985 Mathur ...................... 118/303
4,686,115 A    8/1987 Majer
4,842,790 A    6/1989 Nunnelly
5,501,874 A    3/1996 Yamamoto et al.
5,721,012 A    2/1998 Long, Jr. et al.

* cited by examiner

*Primary Examiner*—Curtis Mayes
*Assistant Examiner*—Yewebdar T Tadesse
(74) *Attorney, Agent, or Firm*—Kolisch Hartwell Dickinson McCormack & Heuser

(57) ABSTRACT

A tumble-coating system involving the coating of wood particles with binder resin featuring, within a tumble drum, baffle structure creating selective curtain flows of particles to promote better coating operation. The preferred embodiment baffle structure includes a long stationary baffle extending through all coating zones in the drum and two additional baffle structures associated with changing particle flow in the vicinity of the resin distribution apparatus.

6 Claims, 4 Drawing Sheets

WOOD PARTICLE/RESIN ETC. TUMBLER-BLENDER

CROSS REFERENCE TO RELATED APPLICATION(S)

This application claims priority to U.S. Provisional Application Ser. No. 60/135,296, filed on May 21, 1999.

BACKGROUND AND SUMMARY OF THE INVENTION

This invention relates to a method and apparatus for tumble-coating particles, and in particular, to a significantly improved method and apparatus which is especially suitable for the continuous coating (in a drum-like tumbler-blender) of wood particles with one or more sprayed coating agencies, such as a liquid (or powder-form) resinous binder, and/or a liquid wax. For the purpose of illustration, a preferred embodiment (and several modifications) of the invention, and a preferred manner of practicing the same, are described herein particularly in the context of coating wood particles with a resinous liquid binder—specifically, coating such particles in preparation for sending the blended/coated material into a former for making composition board.

In the usual manufacture of composition board of the type formed from a blend of wood flakes, slivers, fines and other wood particles, these wood-constituent components (furnish), prior to their being formed into a finished manufactured, composition board product, are conventionally coated with one or more coating materials, such as (1) a suitable resinous liquid binder, (2) a wax, and/or (3) possibly various other related or different additive substances (liquid or powder). In relation to the use and handling of liquid resin and wood furnish during such a coating operation, several significant coating-efficiency problems exist—problems which reveal themselves, among other ways, in undesirable clumping in the flow of coated product, and, effectively, in wasted use of resin and wood furnish.

In particular, liquid binder resin, a noticeably expensive material, is usually oversupplied in today's particle-coating equipment as part of an attempt to correct observed inefficiencies in coating and in material flow-management, and to assure proper, thorough, final particle coating. Oversupplied resin however introduces significant waste—a waste which adds to the cost of making composition board both in relation to the expense of the binder material per se, and in the issues which arise from the problematic accumulation and accretion deposit of cured and curing resin on various surfaces in tumble-coating machinery. Such accumulation necessarily requires frequent, recurrent removal of the unwelcome deposit material, and the task of removal is very time-consuming and very expensive.

A large troublesome issue (already mentioned) which is associated with conventional practice is the fact that a conventional output flow of coated wood particles is often characterized by clumping unevenness (so-called doughnutting)—unevenness which evidences itself as irregular amassing and clumping of output coated product. Such clumping comes about at least in part as a consequence of the mentioned resin oversupply which usually takes place, and further, as a consequence of the halting, rather than the smoothly forward-flowing, transport of coated particles in a drum. Material clumps in such an output flow typically each take the form including a central core/mass of poorly, or even non-coated furnish particles, surrounded by a jacketing mass of heavily overcoated furnish particles.

Despite various prior art efforts to eliminate or minimize this clumping/doughnutting difficulty, the problem remains as one that requires creative attention and resolution.

Given this situation, the present invention (as illustrated and described herein) focuses attention on improving the efficiency of drum-like tumbler-blender apparatus, and also of the method involved in the environment of that apparatus, wherein coating of wood-constituent components, prior to their being assembled into composition board, takes place. In particular, it focuses attention: (1) on offering improvements which result in significantly better (more thorough and complete) wood-particle coating; (2) on eliminating the above-mentioned clumping problem chiefly through promoting significantly evenized material flow through a tumbler-blender; (3) on coffecting the wasteful use of resin (and any other additive coating materials); and (4) on doing all of these things in an inexpensive and practical manner.

According to the present invention, these important issues and concerns are addressed by introducing, into an otherwise conventional tumble-coating environment, one or more unique baffle structures that include baffle surfaces which effectively change the tumble-flow paths of particles circulating in a rotary drum in ways which maximize the efficiency of the coating that can be achieved in the drum. While various prior art baffling schemes have been proposed in the past, none offers the advantages that are confirmedly gained by employing the baffling organization specifically proposed by the present invention. The baffling arrangement and method employed by this invention creates a particle-flow condition in a rotary, tumbler-blender structure, such as a drum, which promotes even, non-clumping material flow in that structure, and which further tends to cause substantially all resin which is introduced, for example, by way of a conventional spinning spray structure, to be fully engaged by particles and thus to be substantially fully used and not wasted as a troublesome drum residue which later must be dealt with. Excess resin does not need to be supplied.

According to a preferred embodiment of the invention which utilizes a rotary drum with plural, longitudinally distributed particle-coating zones, each such zone is occupied by a unique baffle structure including one or more specially designed and positioned baffle surfaces that modify the otherwise nominal generally circular tumbling flow of particles in that zone. Most importantly, the invented baffle structure, by altering tumble-flow activities in certain ways that involve the promotion of substantially constant and uniform flow and advancement of material through the drum, dramatically evenizes the output material flow from the drum. It substantially eliminates clumping/doughnutting as a direct consequence of such improved, regularized material flow.

In the simplest form of this preferred embodiment of the invention, a single baffle surface only is employed which creates a generally linear curtain flow of particles on that side of each coating zone which is characterized by downward motion of the nearby wall of the rotating drum. This baffle surface, which preferably is positionally adjustable, redirects particles that enter an upper quadrant in a drum by engaging them and coaxing them toward the opposite side of the coating zone, near the base of which is located a conventional spinner head which distributes coating material, such as a liquid resin.

A more elaborate form of the invention includes, in addition to a baffle surface (or surfaces) of the kind just mentioned, another baffle surface which takes generally the form of a downwardly flaring, truncated cone that acts like a shroud overhead the spinning coating-spray-dispensing nozzle (or head). Each such shroud creates a cylindrical, gravitational shadow region which remains substantially free of particles and a moderately broad (diametrically), cylindrical curtain-fall of particles spread apart in an unconventional manner relative to the associated resin-spray spinner head. Such spreading of particles promotes the invention's ability to create more evenly and thoroughly coated wood particles than are attainable in conventional tumble-coating apparatus.

Yet another important form of the invention includes still another kind of baffle organization which further includes an elongate, inverted V or Y, tent-like arrangement that sits overhead the typical long feeder manifold conduit which carries liquid spray material into each coating zone. This tent-like structure further helps to change the nominal tumble path of particles by engaging certain particles and deflecting them into laterally-spaced curtain flows. Such tent-like structure, in addition, prevents another conventional and troublesome phenomenon known in the art as "bird nesting"—a tendency of coated particles to build sticky clumps on top of the manifold conduit just mentioned.

In the drawings herein which illustrate the most preferred form of the invention, that form includes all three types of these just-mentioned baffle-structure components.

The various features and advantages of the present invention, some of which have just been discussed briefly, will become more fully apparent as the description of the invention which now follows is read in conjunction with the accompanying drawings.

DETAILED DESCRIPTION OF, AND BEST MODE FOR CARRYING OUT, THE INVENTION

Figure 1:
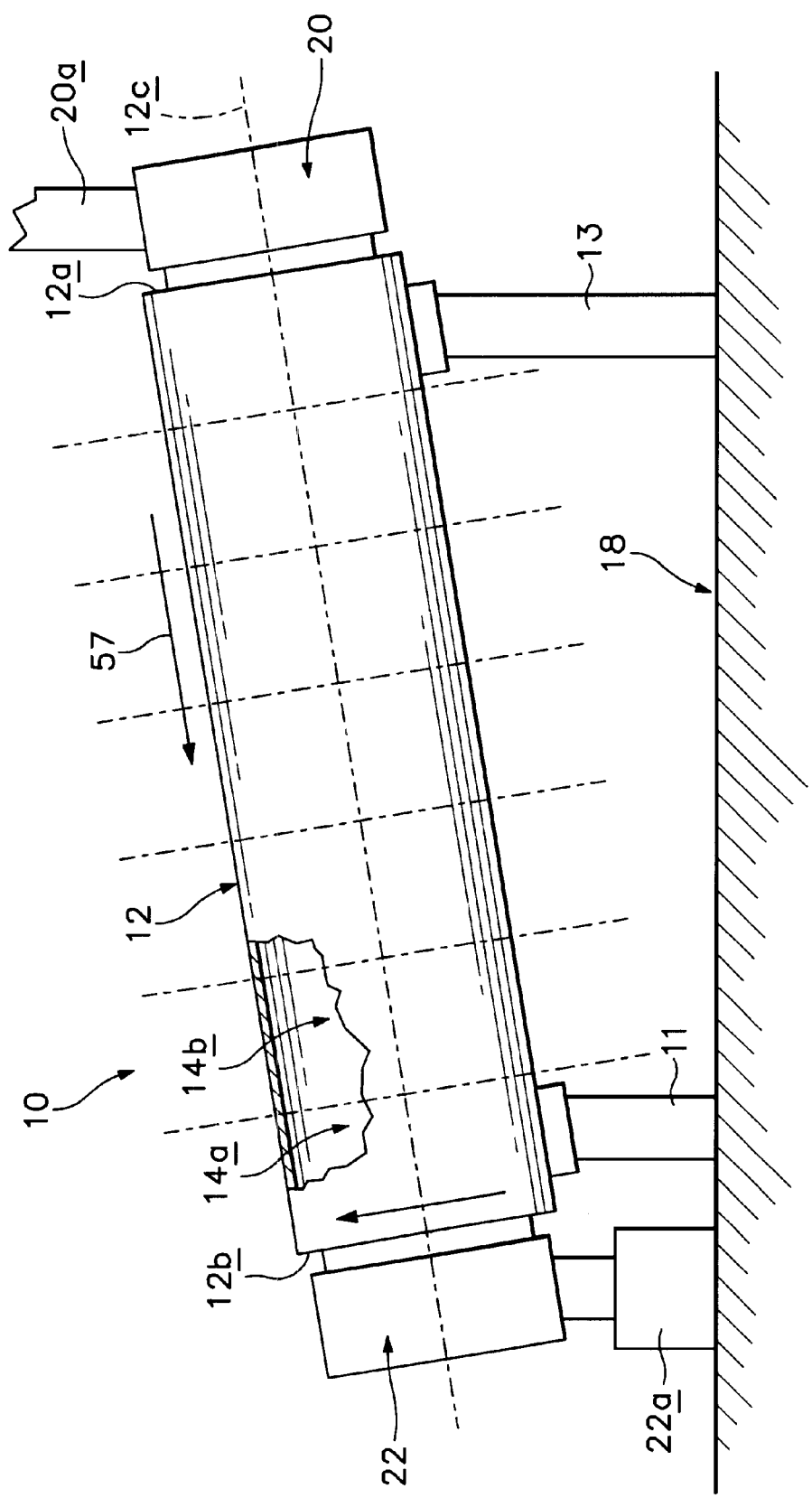
FIG. 1 is a simplified schematic side illustration, somewhat fragmentary in nature, generally illustrating rotary tumble-coating apparatus which is constructed in accordance, and which performs in accordance, with the present invention. A portion of a drum in this apparatus is broken away to show portions of two particle-coating zones disposed therewithin.
Figure 2:
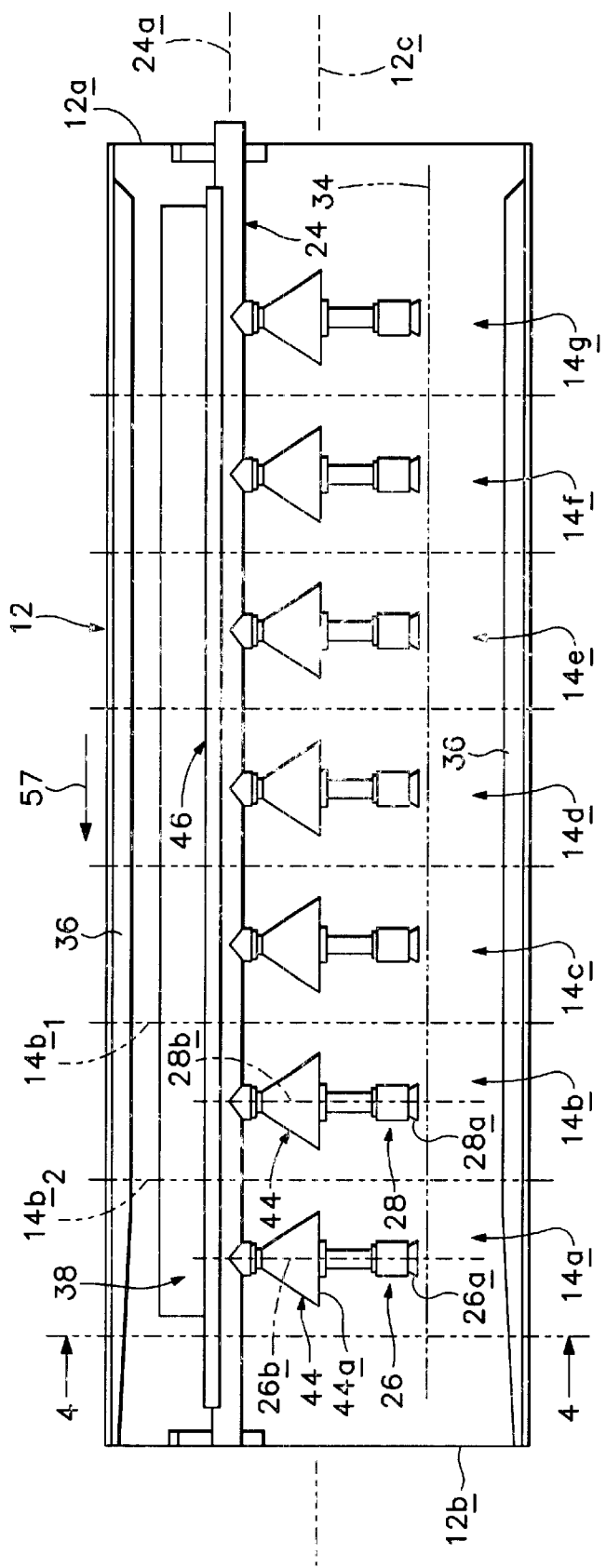
FIG. 2, which is on a somewhat larger scale than that employed in FIG. 1, illustrates in simplified form certain internal components contained in a rotary drum which forms part of the apparatus of FIG. 1, with this drum being shown isolated completely from any external structure, and oriented with its long axis displayed as a horizontal dash-dot line.
Figure 3:
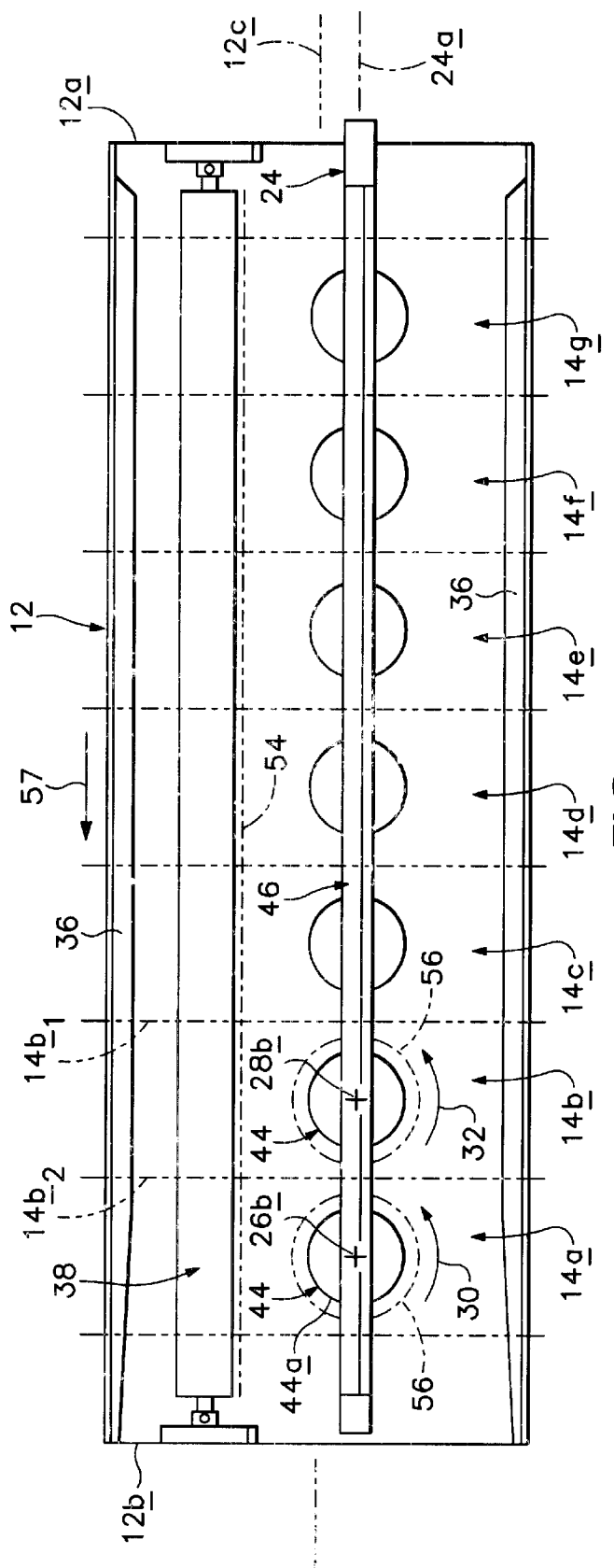
FIG. 3 is view which is very much like that offered in FIG. 2 showing in simplified form internal structure in the drum as such is pictured in FIG. 2, and taken from the point of view which is generally the top side looking down in FIG. 2.

Turning now to the drawings, and referring first of all to FIGS. 1, 2 and 3, indicated generally at 10 in FIG. 1 is a rotary, tumble-coating apparatus designed for use in conjunction with blending and tumble-coating particles of wood with a sprayed liquid resin binder (coating agent), all in preparation for feeding the output, tumble-coated material into conventional downstream equipment employed to create composition board. As will be explained, certain portions of apparatus 10 are constructed in accordance with the present invention, and the balance of apparatus 10 is, essentially, entirely conventional in construction.

In general terms, apparatus 10 includes an elongate, hollow, generally cylindrically-walled rotary drum 12 which includes intake and discharge ends 12a, 12b, respectively. The area inside of the drum effectively contains seven, side-by-side, longitudinally adjacent tumble-coating zones, generally shown at 14a, 14b, 14c, 14d, 14e, 14f, 14g in FIGS. 1–3, inclusive. These zones are also referred to herein as internal coating zones, and as particle-coating zones.

Drum 12, which is essentially entirely conventional in construction, has a length herein of about 30-feet (typical range is about 25-feet to 40-feet), a diameter of about 10-feet (typical range is about 8-feet to 11-feet), and is conventionally mounted, via support and bearing structures 11, 13, adjacent its opposite ends for rotation under power, generally in the direction of arrow 16, and about the drum's long axis 12c. Drum 12, and its long axis 12c, are inclined at a very slight angle relative to the horizontal ground, or ground plane, 18 shown in FIG. 1. The inclination of the drum and its axis is such that they slope downwardly from intake end 12a to discharge end 12b, and at roughly 2-degrees (typical range is 2–4-degrees) to the horizontal.

Pictured generally at 20, 22 are conventional, related end structures that are associated with ends 12a, 12b, respectively, in the drum. These end structures include, inter alia, (a) stationary structure for effectively closing off the opposite ends of the drum, except for certain required openings involved with the receipt and discharge of wood particles and resin, (b) power-drive apparatus (not specifically shown) for imparting rotation to the drum, typically at a speed of about 20-rpm (typical range is about 18-rpm to 22-rpm), and (c) appropriate conventional feed and discharge structures 20a, 22a, respectively, that allow for (1) the feeding in of wood particles and resin to the intake end of the drum, and (2) the output delivery of fully coated particles adjacent end 12b in the drum.

All of the structure so far described is entirely conventional in construction. It forms no part of the present invention, and accordingly, is not illustrated and described herein in any more detail.

Extending longitudinally into the drum from end 12a therein, and specifically into and through each of coating zones 14a–14g, inclusive, is an elongate feeder conduit, or manifold, 24 which carries liquid resin that is to be employed for coating tumbling particles in drum 12. Disposed in the seven particle-coating zones in drum 12, and coupled to conduit 24 for the receipt (and subsequent delivery into the interior of the drum) of liquid resin, are elongate, downwardly extending spinner-head structures, such as the two spinner-head structures shown at 26, 28 seen most clearly in zones 14a, 14b, respectively, near the left side of FIG. 2 in the drawings. These two spinner-head structures, also referred to herein as liquid, coating-agent distributors, include high-speed, motor-driven spinner heads 26a, 28a which, during operation of the drum, spin at a speed of about 14,000-rpm. These heads spin generally in the directions of arrows 30, 32 shown especially in FIG. 3. The axes about which the spinner-heads in these structures spin are generally upright, and are substantially normal to the long axis of conduit 24, which axis is spaced from, and substantially parallel to, drum rotation axis 12c. This long axis of conduit 24 is shown at 24a in FIGS. 2 and 3. All of the liquid resin distribution components so far described are entirely conventional in construction. With the spinner heads operating and delivering resin into spray regions in the respective, associated tumble-coating zones, generally planar, circular and nearly flat sprays of resin are directed into a common spray delivery plane which is shown by dash-triple-dot line 34 in FIG. 2. Progressing radially outwardly from each spinner-head, the associated spray spreads a slight amount in a vertical direction (see dash-triple-dot lines 35 in still-to-be-discussed FIG. 4).

Figure 4:
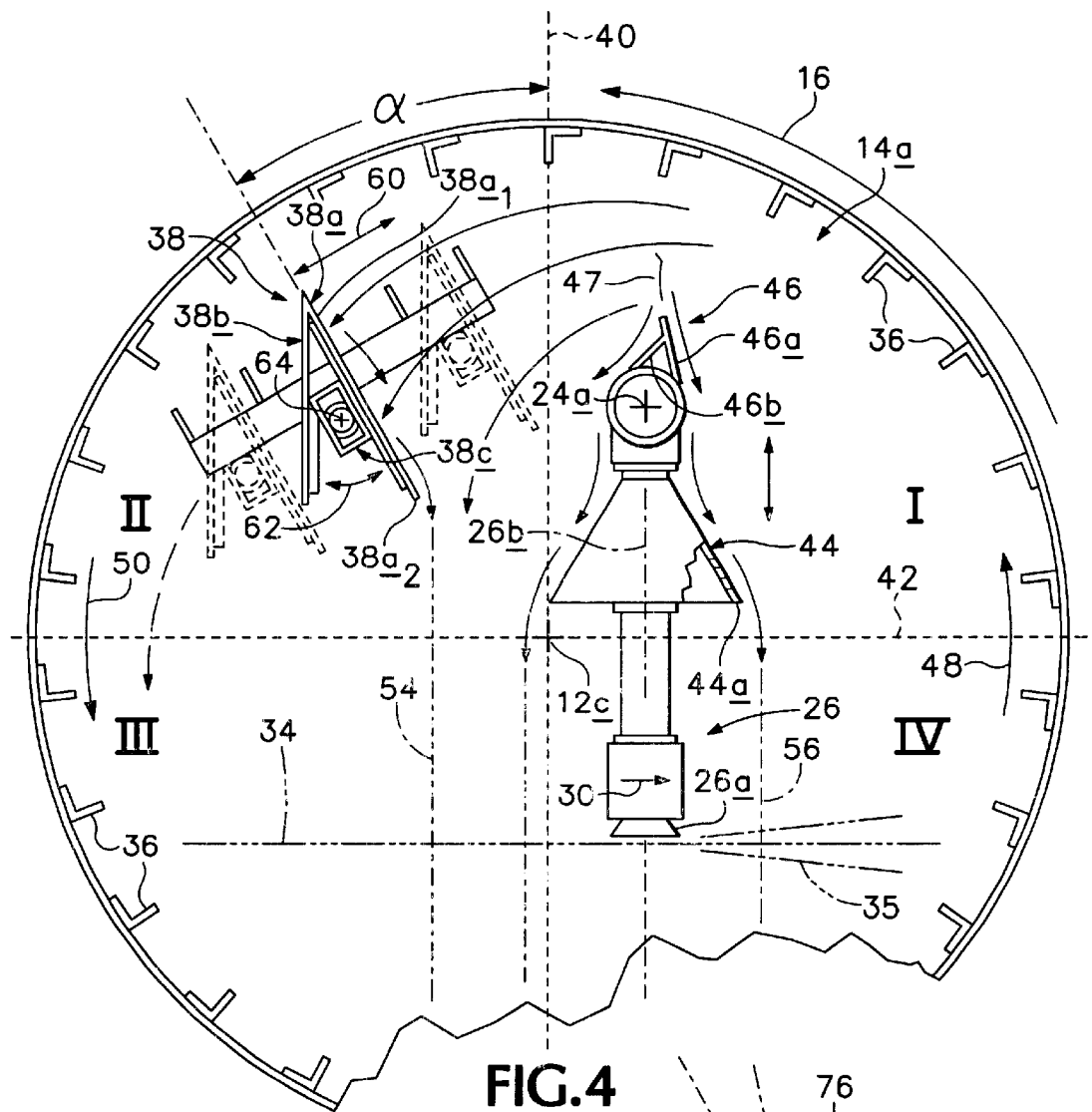
FIG. 4 is a significantly enlarged, fragmentary, cross-sectional view taken generally along the line 4—4 in FIG. 3.
Figure 5:
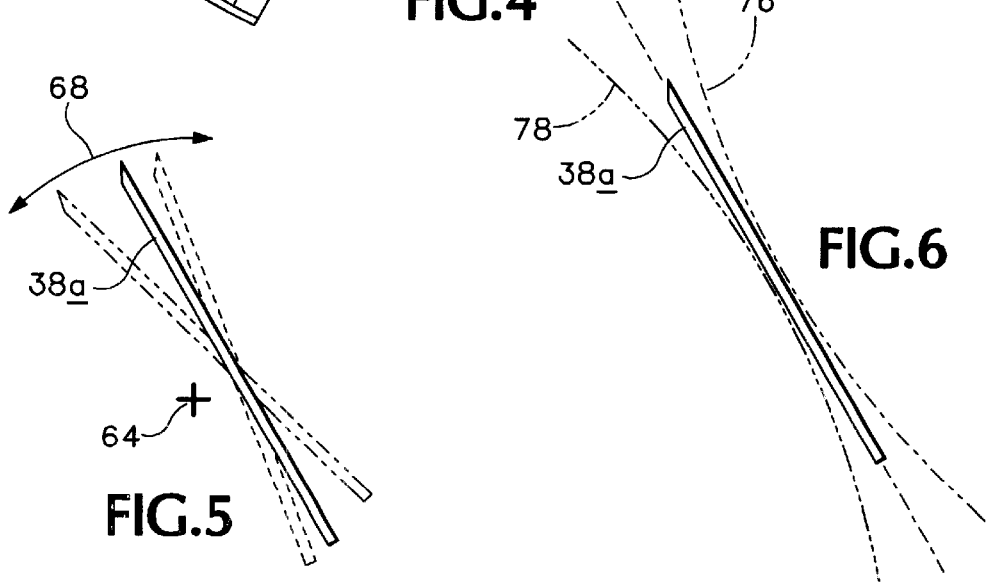
FIG. 5 is a schematic illustration picturing certain angular orientation adjustments which can be made in a portion of the structure of the invention which is shown in FIG. 4.

Considering now FIGS. 4 and 5 along with FIGS. 1, 2 and 3, suitably mounted on the inner cylindrical wall of drum 12 are plural, circumferentially distributed, elongate angle-iron blades, such as blades 36. These blades are suitably secured to the inside of the drum wall with a generally equiangular distribution about axis 12c. The blades aid in a conventional way to participate in creating the nominally circular particle-tumbling activity which takes place within the drum when the same is in use.

The description so far given for drum 12, and the several structures just described therein for the delivery of resin, and for the promotion of tumbling activity, completely describes, in general terms, everything about the illustrated internal environment within drum 12 which is entirely conventional in construction. Other structure, and particularly several contributors to stationary baffle structure which will now be described within the interior of drum 12, forms the apparatus specifically proposed by the present invention to improve tumble-coating operations performed by apparatus 10.

Focusing now especially on the contributed baffle structure of the present invention, indicated generally at 38 in FIGS. 2, 3 and 4 is an elongate, plate-like, stationary baffle structure that extends, as can be seen, longitudinally throughout almost the entire length of the drum, and particularly through each of the seven particle-coating zones present in the drum. As can be seen particularly in FIGS. 2 and 3, baffle structure 38 extends completely through each of the seven particle-coating zones, extending completely from the upstream ends to the downstream ends in each of these zones. This is specifically pointed out in FIGS. 2 and 3, wherein structure 38 is seen to extend completely through, and between the opposite ends $14_{b1}$, $14_{b2}$ of, zone $14_b$. End $14_{b1}$ is the upstream end of this zone, and end $14_{b2}$, the downstream end.

While different specific structural arrangements can be used in the construction of baffle structure 38, the same herein is formed from a pair of elongate baffle plates 38a, 38b (see particularly FIG. 4) joined at an angle with respect to one another, and suitably anchored to an elongate, hollow, rectangular supporting frame member 38c. These three components in structure 38 are formed of any suitable material, such as steel, and the entire assembly has its opposite ends appropriately mounted on (or closely adjacent) the opposite end wall structures provided for drum 12.

With respect to the point of view taken in FIG. 4, the cross-sectional area of the hollow interior of drum 12 is seen to be divided into four quadrants which are labeled I, II, III, IV. These four quadrants are effectively defined by the combination of a vertical plane which is illustrated by dashed line 40 in FIG. 4, and another plane 42 which intersects plane 40 at a right angle thereto. Very specifically, these two planes intersect along, and each contains, previously mentioned drum rotation axis 12c. Within his quadrant arrangement of the inside of drum 12, baffle structure 38 can be seen to be contained essentially completely within quadrant II. This baffle structure is also seen to lie generally on the diametrically opposite side of the drum regarding where the spinner-heads are located, and relative to axis 12c. The spinner-heads essentially lie within quadrant IV.

As will be explained more fully shortly, baffle structure 38 is mounted within drum 12 in a manner which permits it to be adjusted in both a rotational and a translational sense within quadrant II. Considering the specific position and orientation of structure 38 which is shown in solid lines in FIG. 4, baffle plate 38a, which includes a substantially planar, particle-engaging baffle surface $38_{a1}$ that faces generally upwardly and to the right within quadrant II in FIG. 4, is disposed so that surface $38_{a1}$ lies at an angle $\alpha$ relative to the vertical. Angle $\alpha$ as shown is about 30-degrees. Plate 38a includes a lower edge $38_{a2}$ which generally parallels and is spaced from plane 40 by a distance of about 1.5-feet. In the specific structure 38 now being described, plate 38a has a "long" dimension, as such is seen lying in the plane of FIG. 4, extending somewhat radially within zone II, with a length of about 24-inches. The specific size, location and angular orientation of structure 38 and of baffle plate 38a, as such are now being described, have been found to be preferred dimensional and positioning parameters for most applications of the type now generally being described. Variations in these several parameters will be discussed shortly.

Also forming part of the overall baffle structure included in the now-being-described embodiment of the present invention are plural, conical, flaring baffle shrouds 44 which are suitably mounted on and with respect to each of the spinner-head structures provided in drum 12. Shrouds 44 are disposed overhead the respective spinner-heads in these structures, and are generally oriented with their respective axes of revolution each substantially aligned with the long axis of the associated spinner-head structure. Two of such spinner-head axes are pictured variously in FIGS. 2, 3 and 4 at 26b, 28b for structures 26, 28, respectively.

In the structure specifically shown herein, each of shrouds 44 has an "upright" dimension measured along its axis of revolution of about 14-inches. The lower end of each shroud is defined by a circular edge, such as edge 44a seen in FIGS. 2, 3 and 4 within zone 14a, with a diameter of about 24-inches. As was true in the case of the components in baffle structure 38, shrouds 44 are essentially stationary with respect to the "ground".

Completing now the description of baffle structure provided within drum 12 in accordance with the preferred embodiment of the invention, suitably fastened to the upper side of conduit 24 is an elongate, stationary baffle tent structure 46. Tent structure 46 is formed by a pair of angularly joined, straight and linear plates 46a, 46b, which preferably have the angular disposition between them as shown in FIG. 4. The upper edge of plate 46a extends upwardly beyond the upper edge of plate 46b, and plates 46a, 46b together define a somewhat inverted V- or Y-shape for the tent baffle structure.

As can be seen particularly in FIGS. 2 and 3, baffle tent structure 46 extends substantially completely along the length of conduit 24, and thus completely through each one of the seven particle-coating zones mentioned earlier. Referring specifically to structure 46 as the same is shown in FIG. 4, the long dimension of plate 46a which appears there is preferably about 12-inches, and that of plate 46b is about 9-inches. The upper part of plate 46a extends about ½-inches above the upper edge of plate 46b. These long dimensions, are, of course, the dimensions which are pictured lying in the plane of FIG. 4. Plate 46a lies in a plane which resides at an angle of about 75-degrees to the horizontal, and plate 46b lies in another plane which resides at an angle of about 45-degrees to the horizontal. As can be seen especially in FIG. 4, the assemblage of plates 46a, 46b as a whole is angularly offset somewhat to the right of a vertical plane 47 which contains axis 24a. The representations of plates 46a, 46b in FIG. 4 are not exactly to scale.

When the apparatus of the invention which has so far been described is put into use doing a particle-coating operation, and as was previously mentioned, drum 12 rotates in the direction of arrow 16 (a counterclockwise direction in FIG. 4) and at a typical rotation speed of about 20-rpm. Rotation of the drum is, of course, on and about previously-mentioned drum axis 12c. For the purpose of describing and understanding how the various baffle structures of the present invention perform within the interior of drum 12, reference is here made to certain regions inside the drum, and specifically inside the seven particle-coating zones within the drum, as such relate to the four numbered quadrants mentioned earlier. Thus, generally on the right side of the drum as such is pictured in FIG. 4, and namely toward the right side of plane 40, an arrow 48 generally defines an upward-motion side of the drum. An arrow 50 toward the left side of FIG. 4 generally pictures what is referred to herein as a downward-motion side of the drum toward the left side of plane 40. Material generally nominally and circularly tumbling within the drum, therefore, essentially flows with an upward motion in quadrants I and IV, and with a downward motion in quadrants II and III.

In accordance with operation of baffle structures 38, 44, 46 herein, when particles reach the upper regions of the drum in their rotational tumbling within the various tumble-coating zones, certain particles which would otherwise simply flow across plane 40, and from there downwardly in quadrants II and III in the drum, or at least certain ones of these particles, are engaged by baffle surface 38a which directs such engaged particles generally toward the right side of the drum in FIG. 4, and into what is referred to herein as a linear downward curtain-flow of particles represented generally by dash-dot line 54 in FIGS. 3 and 4. It is important to note that this linear curtain-flow of "redirected" particles is contained to the left side of plane 40, and hence to the left sides of the various spinner-heads as such are seen, or could all be seen if all were visible, in FIG. 4. Baffle structure 38 is positioned in what is referred to herein generally as a gravitationally non-shadowing position with respect to the spinner-heads. This gravitationally non-shadowing position is one which assures that baffle structure 38 does not play a role in shadowing the fall of any particles directly overhead the resin-spraying spinner-heads. The region directly below structure 38 is referred to herein as a shadow region.

Particles rising in quadrant I toward the top of the rotating drum which do not have enough momentum to cross plane 40 spill downwardly generally overhead conduit 24 and the resin spinner-head structures. Baffle structure 46, the tent baffle structure, deflects and redirects these particles towards opposite sides of the resin supply conduit so that they are prevented from accumulating and clumping (bird-nesting) on top of this conduit. The thin projecting upper portion of plate 46a aids such prevention. Such redirected particles are then moved outwardly by shrouds 44 to produce what are referred to herein as generally circular, or cylindrical, curtain-flows of particles circumsurrounding each one of the resin-spraying spinner-heads. This activity, with respect to particles that tend to fall downwardly over the resin distribution system, is pictured by a collection of obviously placed arrows in FIG. 4. The circular or cylindrical curtain-flows of particles just mentioned are pictured in FIG. 4, and at two locations in FIG. 3, by dash-dot lines 56.

It will thus be seen that with each of the three types of baffle structures proposed by the present invention incorporated into a rotating drum, such as drum 12, the tumble paths of particles moving within the particle-coating zones in the drum are altered by the baffle structures in the manners just generally described. These altered paths/flows in the different particle-coating zones have been observed to address very effectively the problem issues mentioned earlier herein which are linked to conventional tumble-coating apparatus—i.e., apparatus which does not include baffle structure or structures as proposed by this invention. The flow alterations which are produced, as just described, result in apparatus 10 being capable of delivering properly and substantially fully (as desired) coated wood particles, with essentially just the right relative amounts of wood particles and coating resin employed, and without the presence of the poor coating, undesired resin build-up, and clumping and bird-nesting issues mentioned above. Throughput flow of material in drum 12 is in the direction of arrow 57 (see FIGS. 1, 2 and 3), and typically occurs at a rate of about 35,000-lbs.-per-hour.

As has been stated, a preferred implementation of the present invention is as pictured in FIGS. 2, 3 and 4. Specifically, it is an implementation that is structured with each of the three different kinds of baffle structures mentioned. In some instances, most of the advantages which are achieved by the system pictured in FIGS. 2, 3 and 4 can be obtained by simply incorporating into a rotating drum a baffle structure alone which is essentially like baffle structure 38. Another modification which may be employed to success in certain instances is one which employs a baffle structure like structure 38, with either one of the other two kinds of baffle structures (44, 46) illustrated in FIGS. 2, 3 and 4.

Returning for a moment to matters relevant to both the structure and the mounting of baffle structure 38, the particular baffle structure 38 illustrated herein, while shown with a specific location and angular orientation within quadrant II in drum 16, can be moved both in a translational sense, back and forth generally in the direction of arrow 60 in FIG. 4, and in a rotational sense, generally as is illustrated by double-ended curved arrow 62 in FIG. 4. Arrow 62 curves about an axis shown at 64 in FIG. 4.

In FIG. 4, structure 38 is shown in two different dashed-line positions which are disposed on opposite sides of the solid-line position pictured. Such alternative, translated positions are made possible by an appropriate construction for the end mounting structure provided for structure 38. The exact details of this mounting structure employable to allow such translational adjustment are not specifically disclosed herein, inasmuch as they can take any one of a number of different configurations well within the practice skills of those generally skilled in the field of art of this invention. The overall linear range of translational adjustment permitted in the arrangement of FIG. 4 is about 36-inches.

Referring for a moment to FIG. 5 along with FIG. 4, the mounting structures provided for the opposite ends of baffle structure 38 also permit lockable and unlockable, adjustable angulation of the entire structure about previously-mentioned axis 64. This possibility is illustrated specifically in FIG. 5 by double-ended curved arrow 68, and by the dashed-line and dash-double-dot line picturings of baffle plate 38a in FIG. 5. In the system now being described, the range of permitted angular adjustment is about 40-degrees.

Figure 6:
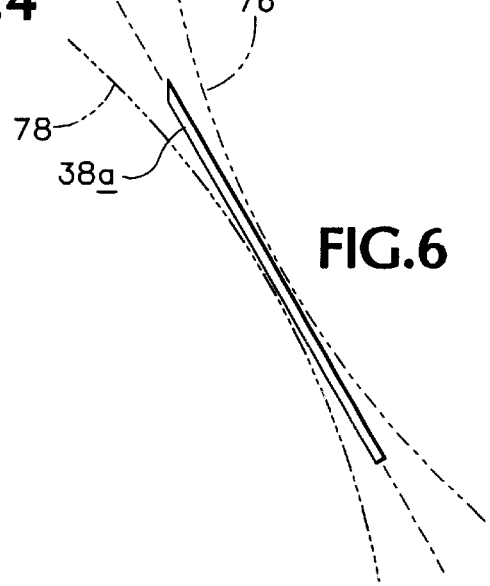
FIG. 6 illustrates two different modifications of a portion of the invention structure as such is pictured in FIGS. 2, 3 and 4.

Turning attention now to FIG. 6 in the drawings, this figure illustrates a baffle plate, like baffle plate 38a, which is so numbered in FIG. 6. In FIG. 6, baffle plate 38a is illustrated essentially in the same form which it has in FIGS. 2, 3 and 4—namely in the form of a substantially linear, flat plate of material. Dash-double-dot line 76 in FIG. 6 illustrates a plate like plate 38a formed with a curvature extending along its length which is generally concave as such is viewed from the upper right side of FIG. 6. Dash-triple-dot line 78 in FIG. 6 illustrates a reverse kind of curvature possibility for plate 38, and specifically curvature which is convex along the length of this plate as such is viewed again from the upper right portion of FIG. 6.

Thus there have been illustrated and described herein, a preferred embodiment, and several useful modifications, of baffle structure constructed in accordance with the present invention. Such baffle structure is easily incorporated, even in a retrofit manner, in otherwise conventional particle-tumbling coating apparatus, and can be furnished in such apparatus either in a fixed-position condition, or with the kinds of angular and/or translational adjustability described for baffle structure 38. Translational and angular adjustments can be made by end users to maximize coating efficiencies in different specific kinds of applications.

The novel method of coating practice which is implemented by the invention can be described as a method for tumble-coating particles with a sprayed coating agent, including the steps, generally, of: (1) establishing, within a coating zone inside a rotary structure, a generally circular, nominal flow of particles to be coated; (2) subjecting particles in one selected region in such a flow to a spray of coating agent; and (3) with respect to certain particles in the flow, and from another selected region in the flow which is both laterally and upwardly spaced relative to the first-mentioned selected region, and utilizing a particle-engaging deflecting instrumentality which is gravitationally non-shadowing with respect to the first-mentioned selected region, deflecting such certain particles out of the path of nominal flow, and laterally toward the first-mentioned selected region.

While the invention has been disclosed in a particular setting in a preferred form herein, the specific embodiments thereof as disclosed and illustrated herein are not to be considered in a limiting sense. Numerous variations, some of which have been shown and discussed, are possible. Applicant regards the subject matter of his invention to include all novel and non-obvious combinations and sub-combinations of the various elements, features, functions and/or properties disclosed herein. No single feature, function, element or property of the disclosed embodiments is essential. The following claims define certain combinations and subcombinations which are regarded as useful, novel and non-obvious. Other such combinations and sub-combinations of features, functions, elements and/or properties may be claimed through amendment of the present claims or through presentation of new claims in this or in a related application. Such amended and/or new claims, whether they are broader, narrower or equal in scope to the originally presented claims, are also regarded as included within the subject matter of applicant's invention.

I claim:

1. Apparatus for tumble-coating particles with a sprayed coating agent comprising a power-driven, elongate, rotary drum having an intake end and a discharge end, mounted for unidirectional rotation relative to the ground about its long axis, said drum including a generally cylindrical wall, and at least one defined, elongate, internal coating zone disposed between the drum's ends and within said wall, said zone including two laterally-adjacent sides disposed on opposite sides of a generally vertical plane containing said long axis, with one side being associated with general upward motion of the adjacent drum wall portion, and the other side being associated with general downward motion of the adjacent drum wall portion, a coating-agent distributor which creates, within a spray region inside said zone, a spray of coating agent, said distributor being spaced from the mentioned vertical plane and positioned within said zone's said one side and including a spinning distributor head which spins on a generally upright axis, and which further includes an elongate, generally conical, downwardly flaring baffle shroud substantially centered conically on said upright axis and disposed above said head, and baffle plate structure which is stationary relative to the ground disposed within said zone's said other side, and including at least one particle-engaging baffle surface which is spaced from the mentioned vertical plane on the other side of said zone and located in a gravitationally non-shadowing position relative to said distributor, and which tends to urge engaged particles laterally toward the distributor, said baffle surface being arranged in such a manner that it engages only particles which have moved into the zone's said other side from its said one side, and which also are above a generally horizontal plane that contains the drum's said long axis.

2. Apparatus for tumble-coating particles with a sprayed coating agent comprising a power-driven, elongate, rotary drum having an intake end and a discharge end, mounted for unidirectional rotation relative to the ground about its long axis, said drum including a generally cylindrical wall, and at least one defined, elongate, internal coating zone disposed between the drum's ends and within said wall, said zone including two laterally-adjacent sides disposed on opposite sides of a generally vertical plane containing said long axis, with one side being associated with general upward motion of the adjacent drum wall portion, and the other side being associated with general downward motion of the adjacent drum wall portion, a coating-agent distributor which creates, within a spray region inside said zone, a spray of coating agent, said distributor being spaced from the mentioned vertical plane, positioned within said zone's said one side, and furnished with coating agent via an elongate conduit whose long axis substantially parallels said drum's said long axis, an elongate baffle tent disposed above and along said conduit, said tent, as viewed generally along said two long axes, generally having an inverted V-shaped configuration, and baffle plate structure which is stationary relative to the ground disposed within said zone's said other side, and including at least one particle-engaging baffle surface which is spaced from the mentioned vertical plane on the other side of said zone and located in a gravitationally non-shadowing position relative to said distributor, and which tends to urge engaged particles laterally toward the distributor, said baffle surface being arranged in such a manner that it engages only particles which have moved into the zone's said other side from its said one side, and which also are above a generally horizontal plane that contains the drum's said long axis.

3. Apparatus for tumble-coating particles with a sprayed coating agent comprising a power-driven, elongate, rotary drum having an intake end and a discharge end, mounted for unidirectional rotation relative to the ground about its long axis, said drum including a generally cylindrical wall, and at least one defined, elongate, internal coating zone disposed between the drum's ends and within said wall, said zone including two laterally-adjacent sides disposed on opposite sides of a generally vertical plane containing said long axis, with one side being associated with general upward motion of the adjacent drum wall portion, and the other side being associated with general downward motion of the adjacent drum wall portion, a coating-agent distributor which creates, within a spray region inside said zone, a spray of coating agent, said distributor being spaced from the mentioned vertical plane and positioned within said zone's said one side and including a spinning distributor head which spins on a generally upright axis, said distributor being furnished with coating agent via an elongate, overhead conduit whose long axis substantially parallels said drum's said long axis, an elongate, generally conical, downwardly flaring baffle shroud substantially centered conically on said upright axis and disposed above said head, an elongate baffle tent disposed above and along said conduit, said tent, as viewed generally along said two long axes, generally having an inverted, V-shaped configuration, and baffle plate structure which is stationary relative to the ground disposed within said zone's said other side, and including at least one particle-engaging baffle surface which is spaced from the mentioned vertical plane on the other side of said zone and located in a gravitationally non-shadowing position relative to said distributor, and which tends to urge engaged particles laterally toward the distributor, said baffle surface being arranged in such a manner that it engages only particles which have moved into the zone's said other side from its said one side, and which also are above a generally horizontal plane that contains the drum's said long axis.

4. Apparatus for tumble-coating wood particles with a sprayed liquid comprising a rotary drum including a particle-coating zone for receiving and generally circularly-tumbling selected particles, with said zone, in relation to rotation of said drum, having a tumble-rising side and a tumble-falling side, a liquid distributor positioned within said tumble-rising side of said zone for creating, from a distribution point in said zone, a spray of coating liquid which is directed from the distributor into said zone, and stationary baffle structure disposed within said zone including (a) a particle-engaging baffle surface located in said tumble-falling side of said zone, having an edge located above, and to at least one lateral side of, said distribution point, effective to engage certain particles tumbling in the zone above said distribution point, and to form therefrom in said zone, via deflection of such engaged particles in a direction generally from said edge toward said distribution point, a falling curtain of particles which resides to one side of a particle shadow region created by the baffle structure, which shadow region is on the opposite side of said curtain relative to said distribution point, and (b) another particle-engaging baffle surface having an edge which, as viewed generally along an upright line passing through said distribution point, appears generally to circumsurround that point, said second-mentioned edge forming a generally cylindrical falling curtain of particles in said zone.

5. Apparatus for tumble-coating wood particles with a sprayed liquid comprising a rotary drum including a particle-coating zone for receiving and generally circularly-tumbling selected particles, with said zone, in relation to rotation of said drum, having a tumble-rising side and a tumble-falling side, a liquid distributor positioned within said tumble-rising side of said zone for creating, from a distribution point in said zone, a spray of coating liquid which is directed from the distributor into said zone, and stationary baffle structure disposed within said zone including (a) a particle-engaging baffle surface located in said tumble-falling side of said zone, having a substantially straight linear edge located above, and to at least one lateral side of, said distribution point, effective to engage certain particles tumbling in the zone above said distribution point, and to form therefrom in said zone, via deflection of such engaged particles in a direction generally from said edge toward said distribution point, a falling curtain of particles which resides to one side of a particle shadow region created by the baffle structure, which shadow region is on the opposite side of said curtain relative to said distribution point, and (b) another particle-engaging baffle surface having an edge which, as viewed generally along an upright line passing through said distribution point, appears generally to circumsurround that point, said second-mentioned edge forming a generally cylindrical falling curtain of particles in said zone.

6. The apparatus of claim 5 which further includes an elongate feeder conduit extending lengthwise in said zone overhead said liquid distributor, and said baffle structure further includes yet other particle-engaging baffle surfaces (at least two) forming an elongate tent along and overhead said conduit, including a pair of laterally spaced edges each effective to promote, on a different lateral side of said conduit, the formation of an associated falling curtain of particles in said zone.

* * * * *